United States Patent
Mattes et al.

(10) Patent No.: US 9,586,210 B2
(45) Date of Patent: Mar. 7, 2017

(54) APPARATUS AND METHOD FOR COMMINUTING A POLYCRYSTALLINE SILICON ROD

(71) Applicant: Wacker Chemie AG, Munich (DE)

(72) Inventors: Joachim Mattes, Burghausen (DE);
Peter Gruebl, Eichendorf (DE);
Siegfried Riess, Tarsdof (DE)

(73) Assignee: Wacker Chemie AG, Munich (DE)

( * ) Notice: Subject to any disclaimer, the term of this patent is extended or adjusted under 35 U.S.C. 154(b) by 471 days.

(21) Appl. No.: 13/936,292

(22) Filed: Jul. 8, 2013

(65) Prior Publication Data

US 2014/0034763 A1 Feb. 6, 2014

(30) Foreign Application Priority Data

Aug. 1, 2012 (DE) .................. 10 2012 213 565

(51) Int. Cl.
| | |
|---|---|
| *B02C 19/08* | (2006.01) |
| *B02C 1/02* | (2006.01) |
| *C01B 33/02* | (2006.01) |
| *B02C 1/14* | (2006.01) |
| *C01B 33/035* | (2006.01) |

(52) U.S. Cl.
CPC ............ *B02C 19/08* (2013.01); *B02C 1/025* (2013.01); *B02C 1/14* (2013.01); *C01B 33/02* (2013.01); *C01B 33/035* (2013.01)

(58) Field of Classification Search
CPC B02C 19/00; B02C 19/08; B02C 1/14; B02C 1/025; C01B 33/035; C01B 33/02
USPC .............. 241/1, 301, 283, 262, 263
See application file for complete search history.

(56) References Cited

U.S. PATENT DOCUMENTS

| | | | |
|---|---|---|---|
| 4,871,117 | A | 10/1989 | Baueregger |
| 5,660,335 | A | 8/1997 | Koppl |
| 6,360,755 | B1 | 3/2002 | Schantz |
| 7,360,727 | B2 | 4/2008 | Schantz |
| 2005/0082400 | A1 | 4/2005 | Yamauchi et al. |
| 2006/0070569 | A1 | 4/2006 | Andrejewski et al. |
| 2006/0243834 | A1 | 11/2006 | Schantz et al. |
| 2010/0025060 | A1 | 2/2010 | Yamane |
| 2011/0068206 | A1 | 3/2011 | Kondou |
| 2011/0253823 | A1 | 10/2011 | Murai et al. |

FOREIGN PATENT DOCUMENTS

| | | |
|---|---|---|
| CN | 201375905Y Y | 1/2010 |
| CN | 102319594 A | 1/2012 |
| CN | 102600948 A | 7/2012 |
| JP | 10015422 A | 1/1998 |
| JP | 10106242 | 1/1998 |

(Continued)

OTHER PUBLICATIONS

PatBase abstract for KR 2011-0000338 dated (2011).

(Continued)

*Primary Examiner* — Mark Rosenbaum
(74) *Attorney, Agent, or Firm* — Caesar Rivise, PC

(57) ABSTRACT

An apparatus is disclosed for comminuting a polycrystalline silicon rod, which apparatus includes a base, at least one movable comminuting tool and optionally at least one immovable anvil. A silicon rod to be comminuted lies on a longitudinal axis oriented parallel or virtually parallel to the surface of the base and can be adjusted between the comminuting tool and anvil. Also disclosed is a method for comminuting a polycrystalline silicon rod.

9 Claims, 3 Drawing Sheets

(56) References Cited

FOREIGN PATENT DOCUMENTS

JP    2006122902 A    5/2006
KR    20110000338 A   1/2011

OTHER PUBLICATIONS

PatBase abstract for 102600948 (2012).
PatBase abstract for 102319594 (2012).
PatBase abstract for 201375905Y (2010).
Abstract for JP10015422.
Abstract for JP10106242.
European Search Report for corresponding European Patent Application No. 13175097.8 dated May 2, 2014.

US 9,586,210 B2

APPARATUS AND METHOD FOR COMMINUTING A POLYCRYSTALLINE SILICON ROD

BACKGROUND OF THE INVENTION

The invention relates to an apparatus and a method for comminuting polycrystalline silicon.

Polycrystalline silicon is extracted by thermal decomposition of silicon compounds, such as, for instance, trichlorosilane, in a so-called Siemens reactor and accrues in the form of polycrystalline rods.

For the creation of single crystals by means of crucible pulling, the polycrystalline rods must firstly be comminuted into fragments. For applications in the solar industry also, the grown polycrystalline rods must firstly be comminuted into fragments.

In the prior art, various methods for the comminution of silicon rods are known.

U.S. Pat. No. 5,660,335 A discloses a comminution method in which a high-pressure water jet is fired onto a crystal rod.

In U.S. Pat. No. 6,360,755 B1 a method is described in which a crystal rod is comminuted with the aid of shock waves, generated by electrical energy.

In U.S. Pat. No. 4,871,117 A it is proposed to firstly decompact a crystal rod by heat action and then to comminute it by mechanical force action.

U.S. 2010/025060 A1 describes a crushing tool, comprising a drive means for a pneumatic piston, for guiding the piston installed in a housing from a retraction position to a projection position by means of air pressure, a guide tube, connected to the housing and extending in the motional direction of the piston, and a hammer head.

The rear end portion of the hammer head is inserted movably in the front end portion of the guide tube. When the piston is moved out of the retraction position into the projection position, the front end of the piston collides with the rear end of the hammer head.

U.S. Pat. No. 7,360,727 B2 discloses a mechanical crushing apparatus for comminuting a polycrystalline silicon rod, which apparatus comprises a base, as well as comminuting tools and mating tools, wherein comminuting tools and mating tools possess a longitudinal axis which is oriented at right angles to the longitudinal axis of the base and parallel to the surface of the base, and comminuting tools and mating tools are movable in such a way that a silicon rod to be comminuted, lying on the surface of the base, can be adjusted between the tools in such a way that all tools in the region of the silicon rod have contact with the silicon rod and the comminuting tools in front of and behind the silicon rod can be moved in the direction of their longitudinal axis up to a safety distance to the mating tool, and the comminuting tools, by means of a strike motion in the direction of their longitudinal axis, act on the silicon rod and shatter it.

Similarly, U.S. Pat. No. 7,360,727 B2 discloses a method for mechanically comminuting a polycrystalline silicon rod, in which the polycrystalline silicon rod is located on a height-adjustable base and is adjusted there between comminuting tool and mating tools in such a way that all tools in the region of the silicon rod have contact with the silicon rod, and comminuting tools and mating tools in front of or behind the silicon rod are brought closer together up to a safety distance and subsequently, in respect of all comminuting tools bearing against the silicon rod, a recurring striking momentum is started, which striking momentum effects a comminution of the silicon rod.

U.S. 2011/068206 A1 describes a crusher for efficiently comminuting a silicon lump, wherein a small amount of fine crushed material (powder) is formed. The crushing tool comprises a hammer head connected to a piston, wherein the hammer head is located without compressed air in a rest position and, through the use of compressed air, is moved from the rest position to collide with a silicon lump. In the crusher, a multiplicity of mutually spaced crushing tools, each having a hammer head, face the silicon lump present on a base.

It has been shown that, with the method known in the prior art, an optimal crushing result is unattainable. Too much energy, or a large number of recurring strikes, is necessary to comminute the silicon. This has negative effects on the contamination of the silicon. Moreover, the service life of the components used is unsatisfactory.

The object of the present invention has been defined on the basis of the above problems.

DESCRIPTION OF THE INVENTION

Figure 1:
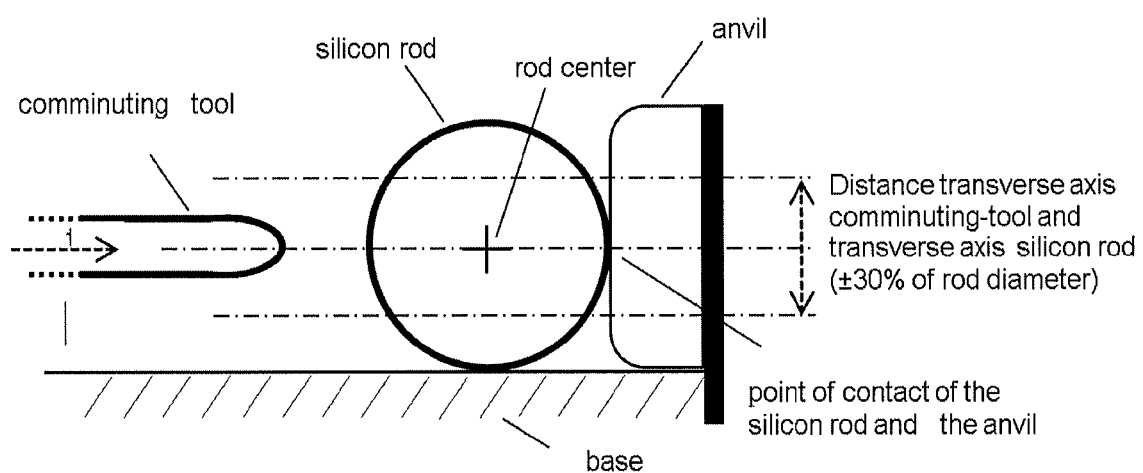
FIG. 1 is a simplified schematic view of an apparatus for comminuting a polycrystalline silicon rod in accordance with an exemplary embodiment of the present invention.
Figure 2:
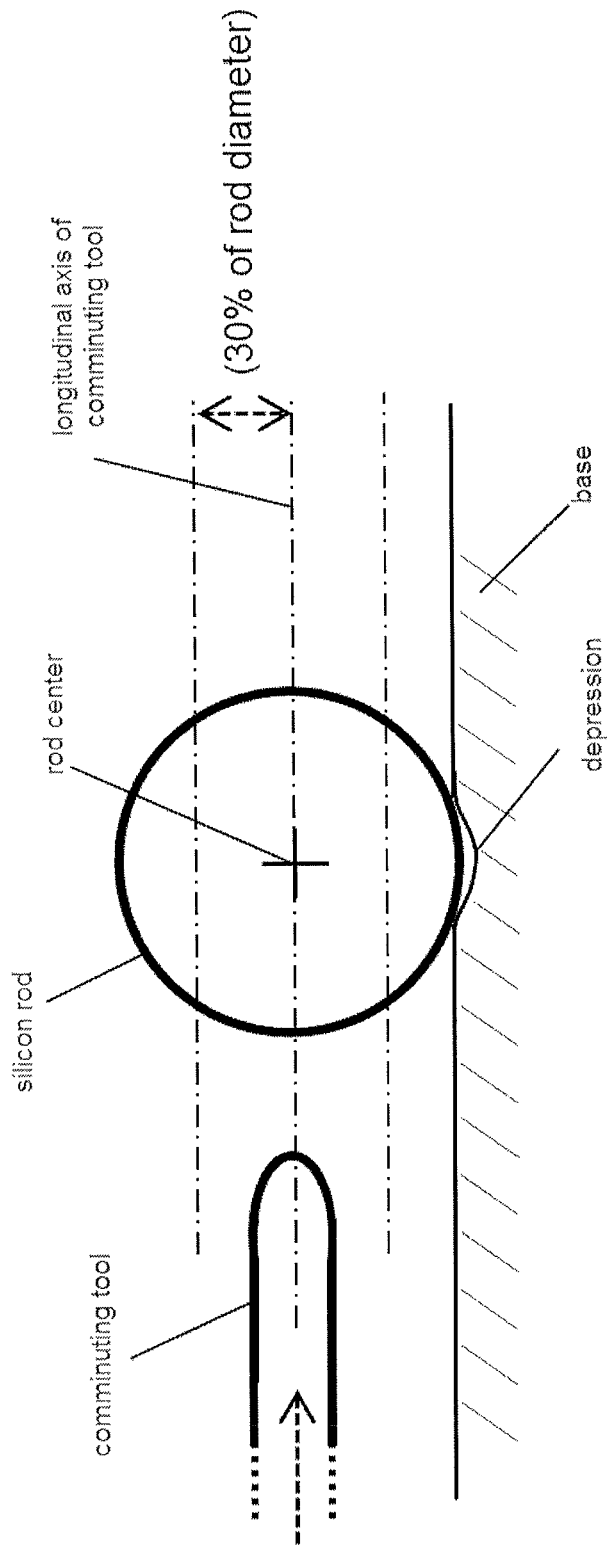
FIG. 2 is a simplified schematic elevation view of an apparatus for comminuting a polycrystalline silicon rod in accordance with a second exemplary embodiment of the present invention.
Figure 3:
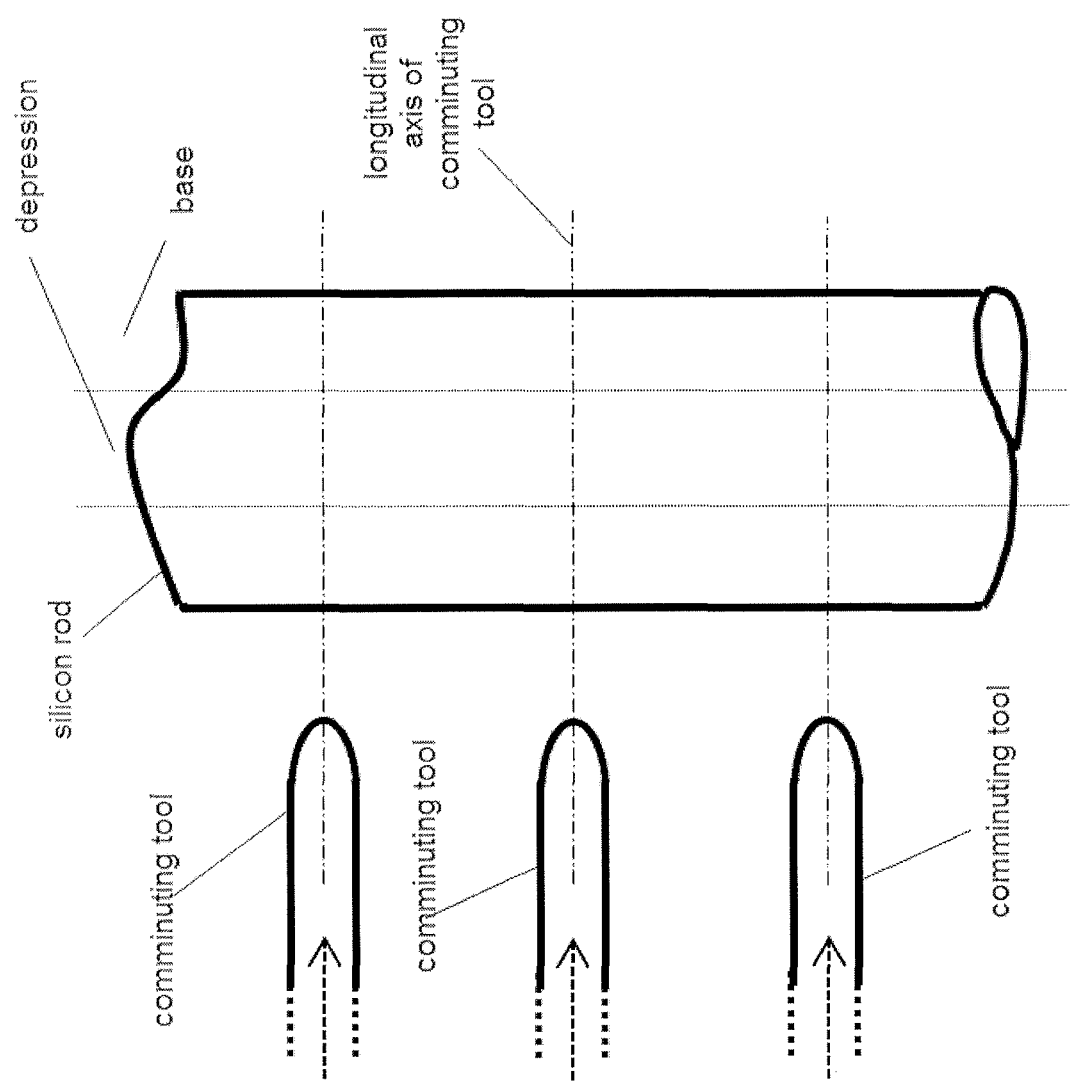
FIG. 3 is a simplified schematic top plan view of the apparatus for comminuting a polycrystalline silicon rod of FIG. 2.

This object is achieved by an apparatus for comminuting a polycrystalline silicon rod, which apparatus comprises a base, as well as at least one movable comminuting tool and at least one immovable anvil, wherein the at least one comminuting tool possesses a longitudinal axis which is oriented parallel or virtually parallel to the surface of the base, wherein a silicon rod to be comminuted, which lies on the surface of the base, can respectively be adjusted between comminuting tool and anvil in such a way that the comminuting tool and the anvil can respectively in the region of the silicon rod have contact with the silicon rod, and a point of contact of silicon rod and anvil, as well as a transverse axis of the silicon rod, which transverse axis runs through a rod center, or an axis of the silicon rod, which axis is parallel to that transverse axis and is distanced by up to 30% of a rod diameter from the rod center, respectively lie on the longitudinal axis of the comminuting tool or on an axis which is parallel to the longitudinal axis of the comminuting tool and is distanced by up to 30% of the rod diameter from the longitudinal axis of the comminuting tool.

The object of the invention is also achieved by a method for comminuting a polycrystalline silicon rod, in which the polycrystalline silicon rod is located on a base and is adjusted there between at least one movable comminuting tool and at least one immovable anvil in such a way that the comminuting tool and the anvil can respectively in the region of the silicon rod have contact with the silicon rod, and a point of contact of silicon rod and anvil, as well as a transverse axis of the silicon rod, which transverse axis runs through a rod center, or an axis of the silicon rod, which axis is parallel to that transverse axis and is distanced by up to 30% of a rod diameter from the rod center respectively lie on the longitudinal axis of the comminuting tool or on an axis which is parallel to the longitudinal axis of the comminuting tool and is distanced by up to 30% of the rod diameter from the longitudinal axis of the comminuting tool, and subsequently a striking momentum is started, wherein, when the striking momentum is started, tool and silicon rod are not touching, whereupon the comminuting tool effects a comminution of the silicon rod.

The silicon rod is preferably constituted by a broadly rotationally symmetric body of substantially circular cross section, which comprises a longitudinal axis and a transverse axis.

Preferably, the longitudinal axis of the comminuting tools, or an axis parallel to the longitudinal axis of the comminuting tool and distanced by up to 30% of the rod diameter from the longitudinal axis of the comminuting tool, a transverse axis through the rod center, or an axis parallel thereto and deviating therefrom by up to 30% of the rod diameter, and the point of contact to the anvil, form one axis.

Preferably, a plurality of comminuting tools and the same number of anvils are used.

Respectively on the longitudinal axis of the comminuting tool, or on an axis parallel to the longitudinal axis of the comminuting tool and distanced by up to 30% of the rod diameter from the longitudinal axis of the comminuting tool, lies a transverse axis of the silicon rod, which transverse axis runs through a rod center, or an axis of the silicon rod, which axis is parallel to that transverse axis and is distanced by up to 30% of a rod diameter from the rod center, as well as a point of contact between silicon rod and anvil. In other words, both anvils and comminuting tools can be displaced independently of one another respectively by up to 30% in both directions from the transverse axis of the silicon rod, which transverse axis runs through a rod center.

Preferably, the transverse axis of the silicon rod, which transverse axis lies on the longitudinal axis of the comminuting tool, or on an axis parallel to the longitudinal axis of the comminuting tool and distanced by up to 30% of the rod diameter from the longitudinal axis of the comminuting tool, is distanced by up to 10% of the rod diameter from the transverse axis of the rod, which transverse axis runs through the rod center.

Preferably, the transverse axis of the silicon rod, which transverse axis lies on the longitudinal axis of the comminuting tool, or on an axis parallel to the longitudinal axis of the comminuting tool and distanced by up to 10% of the rod diameter from the longitudinal axis of the comminuting tool, is distanced by up to 30% of the rod diameter from the transverse axis of the rod, which transverse axis runs through the rod center.

Preferably, the transverse axis of the silicon rod, which transverse axis lies on the longitudinal axis of the comminuting tool, or on an axis parallel to the longitudinal axis of the comminuting tool and distanced by up to 10% of the rod diameter from the longitudinal axis of the comminuting tool, is distanced by up to 10% of the rod diameter from the transverse axis of the rod, which transverse axis runs through the rod center.

Ideally, the transverse axis of the silicon rod, which transverse axis runs through the rod center, and the longitudinal axis of the comminuting tool, as well as the point of contact between anvil and silicon rod, lie on a common axis, which means, in other words, that the point of contact between anvil and silicon rod, as well as the rod center of the silicon rod, lie on the longitudinal axis of the comminuting tool.

By rod center of the silicon rod should be understood a point on the geometric axis (neutral axis which joins together the cross sectional centers of gravity) of the cylindrical rod.

By point of contact should be understood a touching point between anvil and silicon rod.

The comminuting tool is of movable configuration and can preferably be moved in two directions parallel to the striking direction and perpendicular to the plane of the base in order to compensate differences in diameter of the silicon rods. Preferably, the entire crushing unit comprising a plurality of comminuting tools is of movable configuration. Alternatively, for the movement of the comminuting tools parallel to the striking direction and perpendicular to the plane of the base, the base itself can also in the same way be designed to be movable.

The comminuting tool is preferably oriented parallel or at an angle of up to 30° to the base. An inclination of the comminuting tool of 10° is particularly preferred, while in the ideal case the comminuting tool and the base are arranged in parallel.

For each comminuting tool there is provided an oppositely situated anvil, which is immovable relative to the base and preferably has the shape of a cylinder or a semi-cylinder. Within the scope of the invention, the cylindrical shape should also comprise components of elliptical or semi-elliptical cross section. That surface of the anvil which comes into contact with the silicon rod should in any event be curved. This shape can serve to ensure that the silicon rod has precisely one touching point or contact point with the anvil. The anvil can be of single-part and multipart construction. Also the multipart construction of the anvil should be designed such that there is precisely one point of contact between the anvil and the silicon rod.

If, within the scope of the invention, reference is made to an immovable and rigidly fixed anvil, this should be understood to mean that the anvil during operation, i.e. while striking momentums are being triggered, is immovably and rigidly fixed. Otherwise, the anvils can be designed to be absolutely movable in order to facilitate an adjustment of anvil, silicon rod and comminuting tools.

The geometric axis of the anvil stands preferably perpendicular or virtually perpendicular to the striking axis. The geometric axis of the anvil can be inclined by up to 30° to the striking axis. An inclination of the anvil of 10° is particularly preferred, while in the ideal case the geometric axis of the anvil and the striking axis stand perpendicular to each other. The striking axis is given by the longitudinal axis of the comminuting tool.

One end of the comminuting tool, which comes into contact with the silicon rod, preferably has a round shape and preferably comprises no flattening.

In the course of the comminution of the silicon rod, preferably only a single strike with the comminuting tool is made. Where a plurality of comminuting tools are used, precisely one strike is made per comminuting tool. When the striking momentum is started, a distance of the end of the comminuting tool to the silicon rod is preferably chosen such that it corresponds to the pre-set stroke of the comminuting tool minus the possible depth of penetration into the silicon rod. By stroke should be understood a pre-set linear motion of the comminuting tool in the direction of the workpiece. The stroke can usually be varied by adjustable stops. The larger the stroke, the higher is the striking energy.

The anvils are preferably, during operation, rigidly fixed.

The striking axis or longitudinal axis of the at least one comminuting tool and base are preferably inclined at an angle of 0-90° to the horizontal. At an inclination of 90°, the silicon rod touches the base (which in this case constitutes a lateral boundary of the apparatus) and rests on the anvil. An angle of inclination of 1-45° is particularly preferred, so that a silicon rod lying on the base rolls under its own weight against the at least one anvil. Here, an angle of inclination of 1-20° is quite especially preferred.

The anvil(s) and the end(s) of comminuting tool(s) preferably consist of tungsten carbide (WC). Alternatively, hard-metal-coated steels or ceramics can be used for anvil(s) and the end(s) of comminuting tool(s).

Where a plurality of comminuting tools are connected in series, a striking sequence is realized over the length of a silicon rod preferably alternately from outside to inside.

Firstly a striking momentum is realized, for example, by one of the outer situated comminuting tools, then a striking momentum is realized by the comminuting tool which lies adjacent on the other side of the length of the silicon rod, and subsequently, alternatingly, striking momentums are realized by the comminuting tools situated further inward. These alternating strikes are realized preferably in a comparatively short time interval of 5-1000 ms. In order to avoid the influencing of adjacent tools and thus to increase the service life of the tools, after each strike, and prior to triggering of the following tool, the preceding tool is preferably moved back again.

In the case of a multiplicity of comminuting tools, the different regions of a row of comminuting tools can be split into groups in order to make the striking sequences proceed in parallel in all groups.

Alternatively, it is possible to start, in parallel to or alternately to a striking sequence from outside to inside, a striking sequence alternatingly outward from the center of the row of comminuting tools.

Given sufficient distance between comminuting tools, the strikes of individual comminuting tools in a striking sequence can also be realized simultaneously.

While a few embodiments of the striking sequence patterns considered to be preferred are described in the above, it is obvious that changes in the striking sequence patterns are possible without departing from the spirit of the invention. The invention is therefore in no way intended to be limited to the described concrete embodiments.

A large number of crushing tests have led the inventors to recognize that an optimal crushing result with the least possible striking energy is only attainable when respectively a point of contact of silicon rod and anvil, as well as a transverse axis of the silicon rod, which transverse axis runs through a rod center, or an axis of the silicon rod, which axis is parallel to that transverse axis and is distanced by up to 30% of a rod diameter from the rod center, lie on the longitudinal axis of the comminuting tool or on an axis parallel to the longitudinal axis of the comminuting tool and distanced by up to 30% of the rod diameter from the longitudinal axis of the comminuting tool. A study has also been made of the behavior of different silicon material. To this end, tests were conducted with fragile, porous material, as well as with compact silicon. The rigidity of the anvils was also varied in the tests.

It has here been shown that, where hard and rigidly fixed anvils are used in respect of compact material, the least striking energy is required. A striking energy of 200 J can already be sufficient to comminute a compact rod. For the first time, compact silicon rods having a rod diameter >150 mm were able to be crushed with low striking energy and low contamination without the use of a multi-strike.

In the case of fragile material, the configuration of the anvil has lesser influence on the crushing behavior. Regardless of the configuration of the anvil, around 75 J is sufficient to comminute such a rod. In the case of fragile material, it is possible, as already mentioned previously, to wholly dispense with an anvil.

In the case of compact silicon, a striking energy of 400 J is sufficient if a hard and rigidly fixed anvil is used. For instance, an anvil which is made of tungsten carbide and is fixed by a solid, rigid frame construction is suitable for this purpose. If, instead, an anvil made of a softer, more pliable material is used, or a resilient frame construction is used in order to fix the anvil, a striking energy of at least 1000 J is necessary to shatter a compact rod.

A lower striking energy helps to increase the durability/life of the components which are subjected to load by the crushing operation.

Moreover, a low striking energy reduces the level of contamination of the polycrystalline silicon.

In the case of a plurality of contact points, a contact line or a contact surface, the striking force is divided over the rod and thus has a negative effect on the crushing result.

Solutions proposed in the prior art, comprising a V-block or a flat contact surface in the form of a counter-plate, are therefore extremely detrimental to the crushing result. An obliquely angled contact surface has the effect that the retroactive striking momentum, which has an additional crushing effect, is diverted.

The optimal crushing arrangement, which provides that the striking axis lies parallel to the base, minimizes the loads upon the base during the crushing operation.

The base can therefore be made from materials which are less harmful with respect to contamination of the silicon. Silicon, PU or other plastics, for instance, are suitable for this purpose.

The preferred elongated cylindrical shape of the anvil allows total covering of the rod diameter to be crushed. To this end, the height of the anvil over the base should preferably be chosen such that it corresponds to at least half the rod diameter.

The single striking method, in comparison to a recurring striking momentum proposed in the prior art, lessens the level of contamination through contact with comminuting tool and anvil.

The anvil as the contact point should ideally be of hard and rigidly fixed construction in order optimally to reflect the striking momentum. A mating tool which is movable through travel axes—as is claimed in the prior art—cannot fulfill this function.

The slight tilt of the apparatus (striking axis and base) has the effect that the silicon rods roll against the anvil under their own weight and a direct anvil contact which is critical for the optimal crushing result is ensured.

Since the enormous striking energy in the event of simultaneous triggering of a multiplicity of comminuting tools arranged in series would in the long run damage the overall system, comminuting tools are triggered at certain time intervals.

If this is realized, however, directionally from rod piece end to rod piece end, the rod piece, as a consequence of the strikes, can wander/drift in its position and thus reduce the success of the crushing.

A striking sequence which proceeds alternately from the rod ends, and ultimately to the middle of the rod, effectively prevents changes of position of the rod (without a lateral clamping or stop which would otherwise be necessary).

In a preferred embodiment of the apparatus and of the method, it can be provided to dispense with anvils. The striking axis and the base are in this case horizontal. Insofar as the required crushing energy moves within the range <400 J, fragile silicon rods can be crushed even without an anvil. The risk of contamination through contact with the hard-metal anvils is hereby eliminated. To this end, the lining of the base, given sufficient distance to the crushing zone, can be provided with materials with low contamination risk (silicon, PU, plastics). For the stabilization of the rod, a suitable depression can be provided in the base.

What is claimed is:

1. A method for comminuting a polycrystalline silicon rod, comprising:
   locating the polycrystalline silicon rod on a base; and
   adjusting the silicon rod between at least one movable comminuting tool and at least one immovable anvil such that the at least one comminuting tool contacts a region of the silicon rod and such that the silicon rod contacts the at least one anvil, wherein the anvil and the silicon rod have precisely one point of contact and that surface of the anvil which contains this point of contact is curved;
   wherein a longitudinal axis of the comminuting tool is adjusted to be at one of:
      a transverse axis of the silicon rod, which transverse axis runs through a rod center of the silicon rod,
      an axis of the silicon rod, wherein the axis is parallel to the transverse axis and is at a distance of up to 30% of a diameter of the rod from the rod, and
      an axis which is parallel to the longitudinal axis of the comminuting tool and is at a distance of up to 30% of the diameter of the rod from the longitudinal axis of the comminuting tool,
   subsequently starting a striking momentum, wherein, when the striking momentum is started, the comminuting tool and silicon rod are not touching,
   whereupon the comminuting tool effects a comminution of the silicon rod.

2. The method as claimed in claim 1, wherein the at least one anvil has a geometric axis, which stands at a right angle to the longitudinal axis of the comminuting tool.

3. The method as claimed in claim 1, wherein a plurality of comminuting tools are connected in series, and striking momentums in a form of a striking sequence are realized over a length of a silicon rod alternatingly from outside to inside.

4. The method as claimed in claim 2, wherein a plurality of comminuting tools are connected in series, and striking momentums in a form of a striking sequence are realized over a length of a silicon rod alternatingly from outside to inside.

5. The method as claimed in claim 1, wherein the base is lined with a material having low contamination risk for silicon and comprises a suitable depression for keeping the silicon rod in a stable position during the comminution, no separate anvil being provided.

6. A method for comminuting a polycrystalline silicon rod, comprising:
   locating the polycrystalline silicon rod on a base; and
   adjusting the silicon rod in front of at least one movable comminuting tool such that the comminuting tool contacts a region of the silicon rod;
   wherein a longitudinal axis of the comminuting tool is adjusted to be at one of:
      a transverse axis of the silicon rod, which transverse axis runs through a rod center of the silicon rod,
      an axis of the silicon rod, wherein the axis is parallel to the transverse axis and is at a distance of up to 30% of a diameter of the rod from the rod, and
      an axis which is parallel to the longitudinal axis of the comminuting tool and is at a distance of up to 30% of the diameter of the rod from the longitudinal axis of the comminuting tool,
   wherein the base and a striking axis of the comminuting tool are both horizontal;
   subsequently starting a striking momentum, wherein a crushing energy of the comminuting tool is less than 400 J, wherein, when the striking momentum is started, the comminuting tool and silicon rod are not touching,
   whereupon the comminuting tool effects a comminution of the silicon rod.

7. The method as claimed in claim 6, wherein a plurality of comminuting tools are connected in series, and striking momentums in a form of a striking sequence are realized over a length of a silicon rod alternatingly from outside to inside.

8. The method as claimed in claim 7, wherein a plurality of comminuting tools are connected in series, and striking momentums in a form of a striking sequence are realized over a length of a silicon rod alternatingly from outside to inside.

9. The method as claimed in claim 7 wherein the base is lined with a material having low contamination risk for silicon and comprises a suitable depression for keeping the silicon rod in a stable position during the comminution, no separate anvil being provided.

* * * * *